United States Patent
Yamada et al.

(12) 
(10) Patent No.: US 6,343,895 B1
(45) Date of Patent: Feb. 5, 2002

(54) RESIN NET AND ITS PRODUCTION METHOD

(75) Inventors: Kotaro Yamada, Kodaira; Fumitaka Ino, Tanashi; Shinichi Iwasaki, Tokyo; Shinichi Eguchi, Kodaira, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/434,177

(22) Filed: Nov. 5, 1999

(30) Foreign Application Priority Data

| Nov. 6, 1998 | (JP) | 10-315226 |
| Nov. 17, 1998 | (JP) | 10-327127 |
| Nov. 24, 1998 | (JP) | 10-331801 |
| Dec. 8, 1998 | (JP) | 10-348260 |

(51) Int. Cl.$^7$ .................. C09K 17/00; E01C 21/00; E02D 3/00

(52) U.S. Cl. .............. 405/302.7; 405/259.1; 405/262; 428/98

(58) Field of Search ............ 405/259.1, 262, 405/302.3, 302.7; 428/98

(56) References Cited

U.S. PATENT DOCUMENTS

| 4,273,476 A | * | 6/1981 | Kotulla et al. ............ 405/258 |
| 4,374,798 A | | 2/1983 | Mercer .................... 264/288.8 |
| 5,156,495 A | * | 10/1992 | Mercer .................... 405/262 |
| 5,231,151 A | | 7/1993 | Spencer et al. ............ 526/116 |
| 5,277,520 A | * | 1/1994 | Travis ..................... 405/128 |
| 5,419,659 A | * | 5/1995 | Mercer .................... 405/258 |
| 5,735,640 A | * | 4/1998 | Meyer et al. ............... 405/258 |
| 5,773,106 A | | 6/1998 | deGroot et al. ............ 428/35.7 |
| 5,851,089 A | * | 12/1998 | Beretta ................... 405/259.1 |

FOREIGN PATENT DOCUMENTS

| DE | 44 36 159 | 4/1995 |
| EP | 374 365 | 6/1990 |
| EP | 0 380 353 A | 8/1990 |
| EP | 418 104 | 3/1991 |
| EP | 512 752 | 11/1992 |

* cited by examiner

Primary Examiner—David Bagnell
Assistant Examiner—Tara L. Mayo
(74) Attorney, Agent, or Firm—Sughrue Mion, PLLC

(57) ABSTRACT

A soil reinforcing resin net including hole portions arranged in the longitudinal and transverse directions of the resin net, each of which is formed by a pair of opposed ribs and a pair of opposed bars, wherein projecting portions are fixed on bar portions; a method of producing the soil reinforcing resin net; and a drawn product of a polyethylene based resin suitably used as the soil reinforcing resin net, which is obtained by drawing a polyethylene based resin composed of a linear ethylene main chain having 0.3 or more of saturated hydrocarbon groups branched thereto in one molecule.

21 Claims, 8 Drawing Sheets

RESIN NET AND ITS PRODUCTION METHOD

BACKGROUND OF THE INVENTION

The present invention relates to a soil reinforcing resin net and its production method, and also relates to a drawn product of polyethylene based resin which may preferably be used as a soil reinforcing net particularly suitable for preventing slip of filling-up soil or reinforcing soft soil.

In recent years, there is a tendency of filling-up marshy area or low level area for developing residential, industrial or roadway sites. In such site development, since buildings are constructed on the filling-up soil, it is required to prevent collapse of the filling-up soil. To meet such a requirement, filling-up of soil for developing residential site or the like has been made by repeating the step of laying synthetic resin-made reinforcing nets on underlying soil at specific intervals and banking soil thereon to a thickness of several tens cm. Specifically, in recent years, to meet strong demands to increase construction of dwelling houses, there is a tendency to prepare residential site on filling-up soil or soft soil. In this case, the slip of such residential site must be perfectly prevented. In general, to prevent the slip of site and stabilize the filling-up soil, there has been adopted a method of arranging layered nets in soil. The net is generally made from polyethylene which is subjected to uniaxial or biaxial drawing for realizing molecular orientation thereby increasing the strength of polyethylene.

The above soil reinforcing net has a large number of holes. When the net is laid in soil, upper and lower filling-up soil layers arranged with the net put therebetween are jointed to each other through the holes of the net, to prevent collapse the filling-up soil. To effectively prevent collapse of filling-up soil, the net is formed of a sheet of a resin having a high drawability such as high density polyethylene, which sheet is drawn uniaxially or biaxially for making the molecular orientation linear. To be more specific, the sheet is drawn in such a manner that the molecular orientation of the sheet is matched with the direction in which collapse of filling-up soil is anticipated to occur, to prevent elongation of the net when a slip force is applied from filling-up soil to the net, thereby keeping the strength of the net.

FIG. 13 is a schematic view of such a reinforcing resin net 30. The resin net 30 is produced by punching a polyethylene sheet 20 shown in FIG. 14 to form round or rectangular holes 21 therein, and drawing the sheet 20 in a uniaxial direction. By drawing the sheet 20, each hole 21 becomes an elongated hole 31 having a pair of opposed ribs 31a and a pair of opposed bars 31b. In FIG. 13, reference numeral 40 designates a non-punched portion; 40a is a drawn rib portion: and 40b is a non-drawn bar portion.

The resistance force of the net of this type for preventing collapse of filling-up soil is generally tested by laying soil below and above the net 30 to specific thicknesses, pulling the net 30 out of the soil, and taking the pull-out resistance as the resistance force of the net. Such a pull-out resistance has been substantially determined by a thickness of the bars 31b extending in the direction transverse to the pulling direction, that is, the area against the pulling direction. Accordingly, to increase the resistance force of the net 30, there has been taken a countermeasure of increasing the thickness of the sheet 20 as a base of the net 30 or making short the vertical gap, that is, the amount of soil between the two adjacently laid nets 30. The increased thickness of the sheet 20, however, is inconvenient for raising the construction cost. Further, since the boundary between the non-drawn portion and the drawn portion forms a smooth slope, even if the thickness of the non-drawn portion is increased, it is difficult to ensure a desired pull-out resistance.

SUMMARY OF THE INVENTION

An object of the present invention is to provide a soil reinforcing resin net capable of improving pull-out resistance in soil, and its production method.

Another object of the present invention is to provide a drawn product of polyethylene based resin with improved creep characteristic and increased strength, which is suitable for soil reinforcement.

According to a first aspect of the present invention, there is provided a soil reinforcing resin net including hole portions arranged in the longitudinal and transverse directions of the resin net, each of which is formed by a pair of opposed ribs and a pair of opposed bars, wherein projecting portions formed typically into fillet shapes are fixed on bar portions, preferably, in the direction transverse to the drawing plane of the hole portions. The projecting portions may be fixed on the bar portions by vibrational fusion, ultrasonic fusion or hot plate fusion.

According to a second aspect of the present invention, there is provided a method of producing a soil reinforcing resin net, including the steps of: punching a resin sheet to form hole portions arranged in the longitudinal and transverse directions of the resin sheet; drawing the resin sheet having the hole portions in the uniaxial direction, to form elongated hole portions each having a pair of opposed ribs and a pair of opposed bars; and fixing projecting portions on bar portions by vibrational fusion, ultrasonic fusion or hot plate fusion. In this method, the projecting portions may be fixed on the bar portions in the direction transverse to the drawing direction of the hole portions.

According to the soil reinforcing resin net of the present invention, since the projecting portions, for example, fillet portions are fixed on the bar portions extending in the direction transverse to the drawing direction of the net, it is possible to significantly increase the pull-out resistance in soil of the resin net.

The soil reinforcing resin net is generally made of a high corrosion resisting polypropylene or polyethylene sheet which is little compatible with adhesive, and therefore, it has been difficult to fix separate projecting portions to bar portions of the sheet by adhesive joint.

According to the present invention, however, the bar portion is fused by vibration, ultrasonic waves, or hot plate, and the projecting portions are fixed on the bar portion thus fused. To be more specific, the projecting portions are brought into press-contact with the bar portions, and are fixed thereto by the above-described fusing means such as vibration. In other words, according to the present invention, the projecting portions can be fixed to the bar portions not by using the chemical adhesive bonding mechanism but by using the mechanical fixing mechanism. For example, the fixing of the projecting portions to the bar portions of the resin net by vibrational fusion is performed by bringing the projecting portions into press-contact with the bar portions of the resin net, applying fine vibration to the press-contact portions to give an energy to the bar portions, being press-contact with the projecting portions, of the resin net thereby softening them, and re-hardening the softened bar portions of the resin net in a state in which the softened bar portions surround the projecting portions. Additionally, the projecting portions can be fixed to the bar portions of the net in the state before drawing.

The projecting portion is mainly made from the same material as that of the resin net, such as polypropylene or polyethylene. The shape of the projecting portion is not particularly limited and, for example, it may be a columnar, three-dimensional or groove shape. The length of the projecting portion can be also arbitrarily selected.

According to a third aspect of the present invention, there is provided a method of producing a soil reinforcing resin net, including the steps of: punching a resin sheet to form hole portions arranged in the longitudinal and transverse directions of the resin sheet and simultaneously forming, by pressing, a plurality of projections on bar portions between the hole portions at specific intervals in the transverse direction; and drawing the resin sheet having the hole portions in the longitudinal direction to form elongated hole portions each having a pair of opposed ribs and a pair of opposed bars, thereby forming the projections on the bar portions of the drawn sheet.

According to the third aspect of the present invention, since a plurality of the projections are formed by pressing, before drawing, on the bar portions of the resin sheet, which become the bar portions extending in the direction transverse to the drawing direction of the resin net, it is possible to significantly increase the pull-out resistance in soil of the resin net.

The soil reinforcing resin net is generally formed of a high corrosion resisting polypropylene or polyethylene sheet which is little compatible with adhesive, and therefore, it has been difficult to fix separate projecting portions to bar portions of the sheet by adhesive joint.

According to the present invention, however, the projections are formed by pressing, before drawing, on the bar portions of the sheet, which become the bar portions extending in the direction transverse to the drawing direction of the net. The projection may be formed at a crossing portion surrounded by four of the hole portions in the non-punched portion; however, it may be formed at the bar portion (non-punched portion) put between the hole portions arranged in the longitudinal direction of the resin sheet. With this configuration, upon formation of the net, the projection is formed into the shape functioning as a tire spike between the elongated hole portions. Accordingly, the resin net exhibits the spike effect to fill-up soil. From the viewpoint of the production steps and production cost, it may be desirable to form the projections by pressing simultaneously with punching of the hole portions.

Additionally, in the case of forming each projection at a crossing portion surrounded by four of the hole portions in the non-punched portion by pressing, stress concentration occurs at the projection upon drawing the sheet, and accordingly, it is difficult to keep the original shape of the projection after drawing of the sheet.

According to a fourth aspect of the present invention, there is provided a method of producing a soil reinforcing resin net, including the steps of: punching a corrosion resisting resin sheet generally made from polypropylene or polyethylene to form hole portions regularly arranged in the longitudinal and transverse directions; drawing the resin sheet having the hole portions in the uniaxial direction to form elongated hole portions each having a pair of opposed ribs and a pair of opposed bars; and forming projections on bar portions of the drawn sheet by pressing. The projections are preferably formed on the bar portions between the elongated hole portions.

In this way, the resin sheet is punched to form the hole portions regularly arranged in the longitudinal and transverse directions and is drawn in the uniaxial direction to form the elongated hole portions. The projections are then formed on the bar portions remaining in the direction transverse to the drawing direction by elastically deforming the positions, corresponding to the projections, of the bar portions by pressing using a press on which upper and lower dies having recesses and projections respectively are mounted. According to this method, the projections can be formed into predetermined shapes, and the shapes of the projections are not deformed because the projections are formed after the drawing step. As a result, the resin net of the present invention can certainly ensure an improved pull-out resistance in soil.

The shape of the projection is not particularly limited; however, it is generally formed into a cylindrical shape. To be more specific, the cylindrical projection is formed on the front side of the net and the recess corresponding to the projection is formed on the back side of the net in accordance with the shape of the cavity of the die used in pressing.

According to the present invention, there is also provided a drawn product of a polyethylene based resin obtained by drawing a polyethylene based resin composed of a linear ethylene main chain having 0.3 or more (in average) of saturated hydrocarbon groups branched thereto in one molecule.

It is known that when high density polyethylene is drawn, ethylene molecules are oriented in the drawing direction, whereby a drawn product having a high molecular orientation is obtained. The drawn product of high density polyethylene is obtained by zone drawing, roll drawing, high pressure extrusion, high frequency hot drawing, gel drawing, or melting crystallization, and is expected as a material having a high strength and a high elastic modulus. The drawn product of high density polyethylene having a high strength and a high elastic modulus, however, has a disadvantage that the creep characteristic as a criterion to evaluate the shape stability in long-term use. If the drawn product of high density polyethylene, which is poor in creep characteristic, is used for a soil reinforcing net, there may occur a problem. According to the drawn product of the present invention, it is possible to solve such a problem.

In general, linear high density polyethylene having a density of 0.94 g/cm$^3$ or more is different from low density polyethylene having a density less than 0.94 g/cm$^3$ and many branched chains, and thereby being soft. In the case of drawing high density polyethylene, it is easy to be crystallized because of its linear main chain so that the structure of the drawn product is composed large crystal portions each having a lamellar structure in which the molecular chain is arranged in parallel to the drawing axis and slight amorphous portions each being put between the crystal portions. Since the crystal portions are rigid, the creep characteristic is dependent on the stretching state and entanglement of molecules in the amorphous portions, and since the branched chains slightly introduced in the linear main chain are present in the amorphous portions, the entanglement and the stretching state of molecules in the amorphous portion are increased due to the presence of the branched chains. In this way, the present inventors have found that when a drawn product of high density polyethylene based resin in which branched chains are introduced in the linear main chain is subjected to a creep test in which a load is applied to the drawn product for a long time, the elongation of the drawn product is suppressed at minimum, and that when the drawn product of the polyethylene based resin excellent in creep characteristic is used for reinforcing filling-up soil or soft soil, it is possible to obtain a desirable soil reinforcing effect stably kept for a long term.

DETAILED DESCRIPTION OF THE PREFERRED EMBODIMENT

Hereinafter, embodiments of the present invention will be described with reference to the drawings.

First, a soil reinforcing resin net according to a first embodiment of the present invention and a method of producing the soil reinforcing resin net according to a second embodiment of the present invention will be described.

Figure 1:
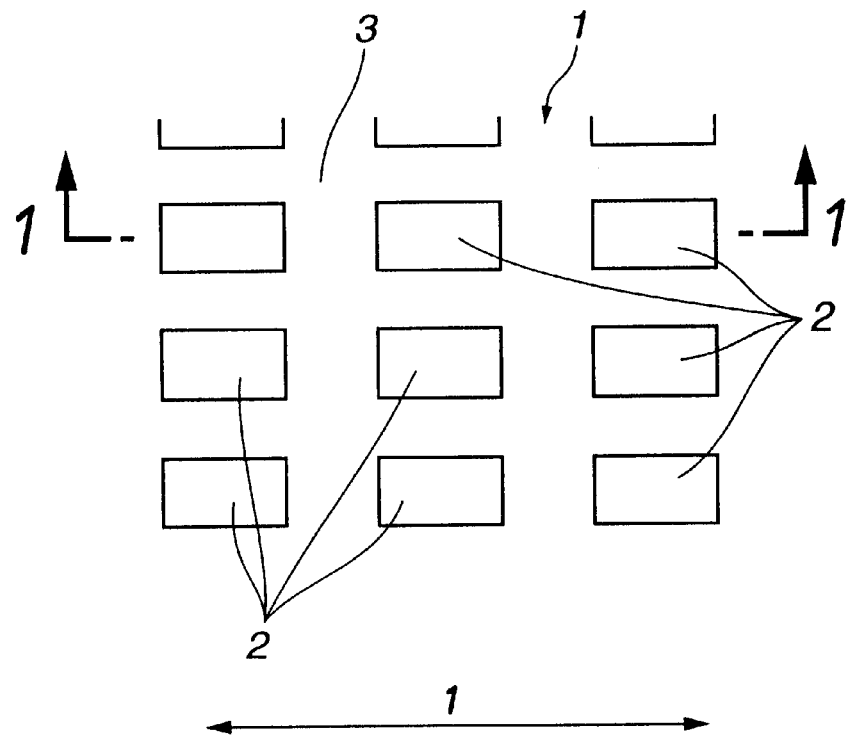
FIG. 1 is a plan view of a sheet taken as a base of a soil reinforcing resin net according to a first embodiment of the present invention.
Figure 2:
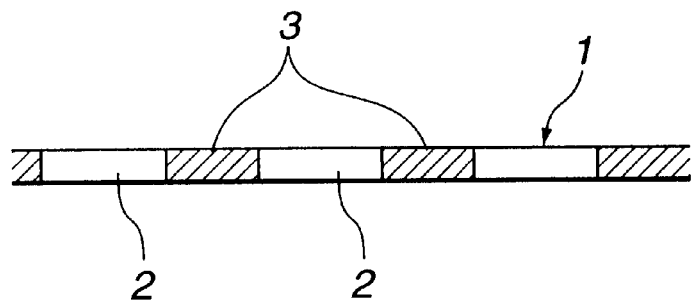
FIG. 2 is a sectional view taken on line 1—1 of the soil reinforcing resin net according to the first embodiment shown in FIG. 1.

FIG. 1 is a plan view of a sheet taken as a base of a soil reinforcing resin net of the present invention, and FIG. 2 is a sectional view taken on line 1—1 of FIG. 1. A polyethylene sheet 1 having a thickness of 2 mm is punched to form rectangular holes 2 each having a size of 10 mm×20 mm. The rectangular holes 2 are spaced at intervals of 10 mm in the transverse direction and spaced at intervals of 15 mm in the longitudinal direction. The polyethylene sheet 1 is then drawn in the direction along the long sides of the holes 2 (in the direction 1 in FIG. 1). In the figures, reference numeral 3 designates a land portion.

Figure 3:
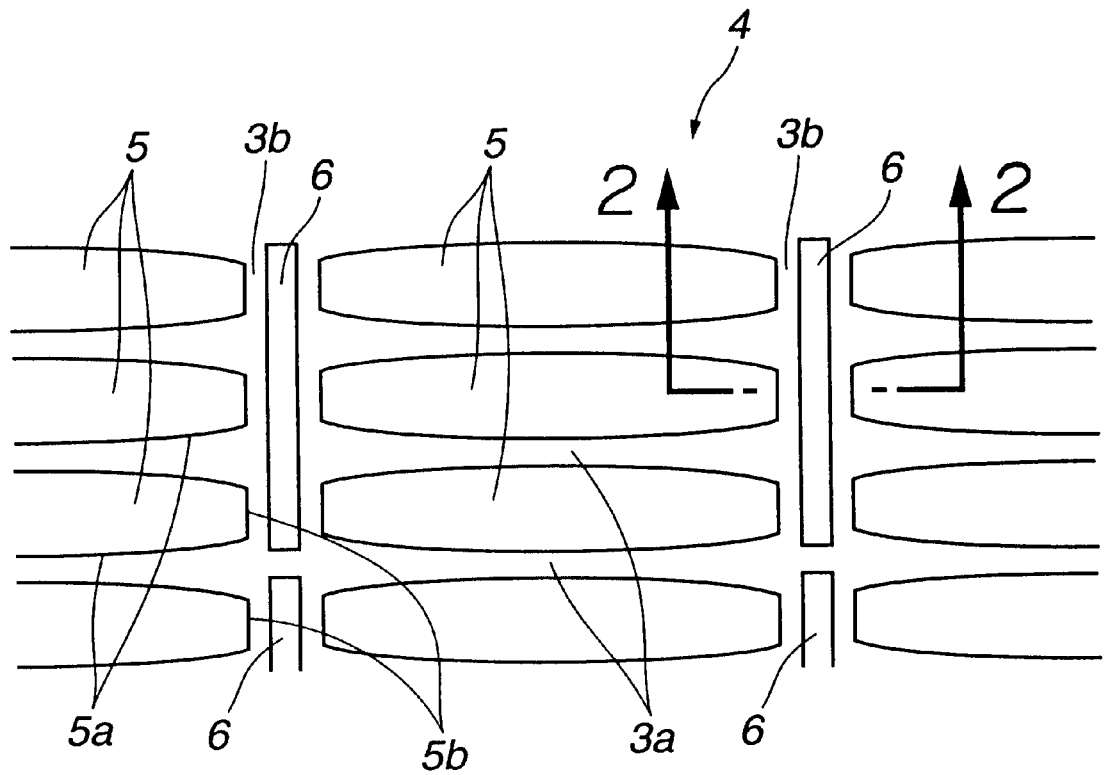
FIG. 3 is a plan view of the soil reinforcing resin net according to the first embodiment.
Figure 4:
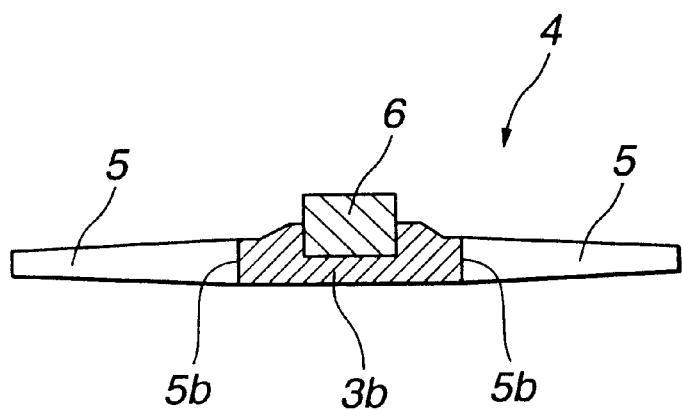
FIG. 4 is a sectional view taken on line 2—2 of the soil reinforcing resin net according to the first embodiment.

FIG. 3 is a plan view of a soil reinforcing resin net 4 thus obtained, and FIG. 4 is a sectional view taken on line 2—2 of FIG. 3. A hole 5 in the soil reinforcing resin net 4 is formed by opposed ribs 5a and opposed bars 5b. The length of the ribs 5a is 150 mm. Each bar-like body (projecting portion) 6 made from nylon and having a size of 5 mm×3 mm is disposed on a bar portion 3b (non-drawn land portion) between the bars 5b in such a manner as to cross over a plurality (three in the figure) of the holes 5, and is fixed thereon by vibrational fusion. In FIG. 3, reference numeral 3a designates a rib portion.

The fixing of the bar-like bodies 6 on the bar portions 3b of the soil reinforcing resin net 4 was substantially perfect, and therefore, the bar-like bodies 6 were not peeled from the bar portions 3b in a pull-out resistance test.

In this way, the present invention is characterized in that the projecting portions are fixed on the bar portions of the soil reinforcing resin net, whereby the pull-out resistance of the resin net becomes very large. 1

FIG. 1 is a plan view of a sheet taken as a base of a soil reinforcing resin net of the present invention, and FIG. 2 is a sectional view taken on line 1—1 of FIG. 1. A polyethylene sheet 1 having a thickness of 2 mm is punched to form rectangular holes 2 each having a size of 10 mm×20 mm. The rectangular holes 2 are spaced at intervals of 10 mm in the transverse direction and spaced at intervals of 15 mm in the longitudinal direction. The polyethylene sheet 1 is then drawn in the direction along the long sides of the holes 2 (in the direction 1 in FIG. 1). In the figures, reference numeral 3 designates a land portion.

FIG. 3 is a plan view of a soil reinforcing resin net 4 thus obtained, and FIG. 4 is a sectional view taken on line 2—2 of FIG. 3. A hole 5 in the soil reinforcing resin net 4 is formed by opposed ribs 5a and opposed bars 5b. The length of the ribs 5a is 150 mm. Each bar-like body (projecting portion) 6 made from nylon and having a size of 5 mm×3 mm is disposed on a bar portion 3b (non-drawn land portion) between the bars 5b in such a manner as to cross over a plurality (three in the figure) of the holes 5, and is fixed thereon by vibrational fusion. In FIG. 3, reference numeral 3a designates a rib portion.

Figure 5:
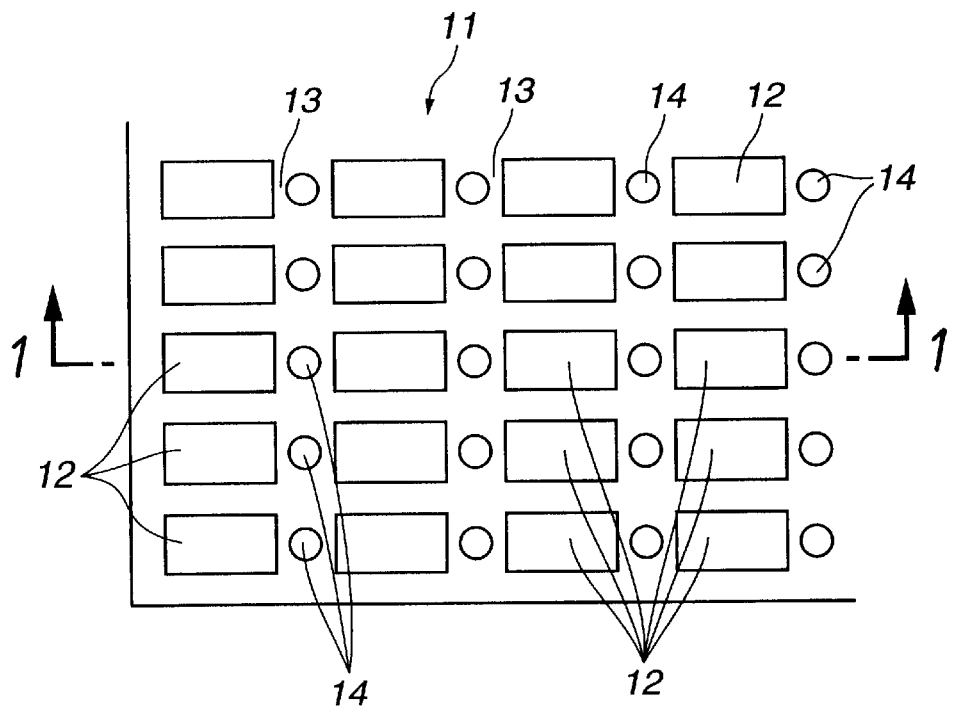
FIG. 5 is a plan view of a sheet taken as a base of a soil reinforcing resin net according to a third embodiment of the present invention.
Figure 6:
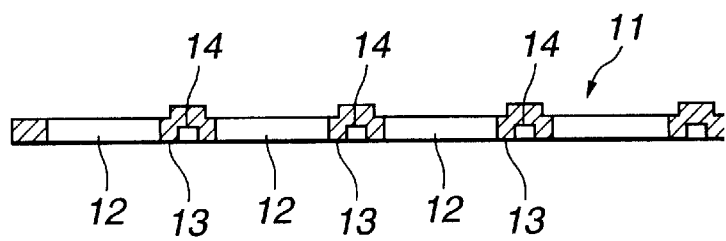
FIG. 6 is a sectional view taken on line 1—1 of the soil reinforcing resin net according to the third embodiment.

FIG. 5 is a plan view of a sheet taken as a base of a resin net according to a third embodiment of the present invention; and FIG. 6 is a sectional view taken on line 1—1 of FIG. 5. A polyethylene sheet 11 having a thickness of 2 mm is punched to form rectangular holes 12 each having a size of 10 mm×20 mm. The rectangular holes 12 are spaced at intervals of 10 mm in the transverse direction and spaced at intervals of 15 mm in the horizontal direction. Projections 14 are formed, simultaneously with punching, on non-punched portions (land portions) 13 put between the punched holes 12, that is, on bar portions between short sides of the rectangular holes 12 in the direction perpendicular to the drawing direction by pressing.

Figure 7:
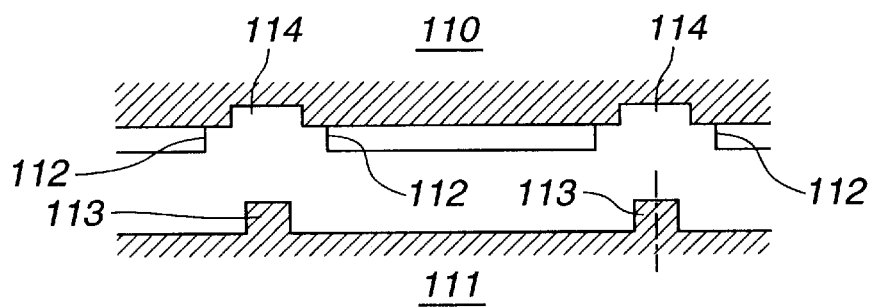
FIG. 7 is a view showing an essential portion of a pressing machine.

The above-described press working is performed by using a pressing machine shown in FIG. 7. The pressing machine includes an upper die 110 having cutters 112 spaced at intervals for punching the sheet 11 to form the rectangular holes 12 and also having recesses 114 between the cutters 112, and a lower die 111 having projections 113 corresponding to the recesses 114. By use of such a pressing machine, the rectangular holes 12 are formed by punching, and simultaneously the projections 14 are formed by elastically deforming portions, located between the projections 113 and recesses 114, of the sheet 11. The height of the projection 14 is 4 mm.

The sheet 11 is drawn in the direction along the long sides of the rectangular holes 12, to obtain a soil reinforcing resin net 15.

Figure 8:
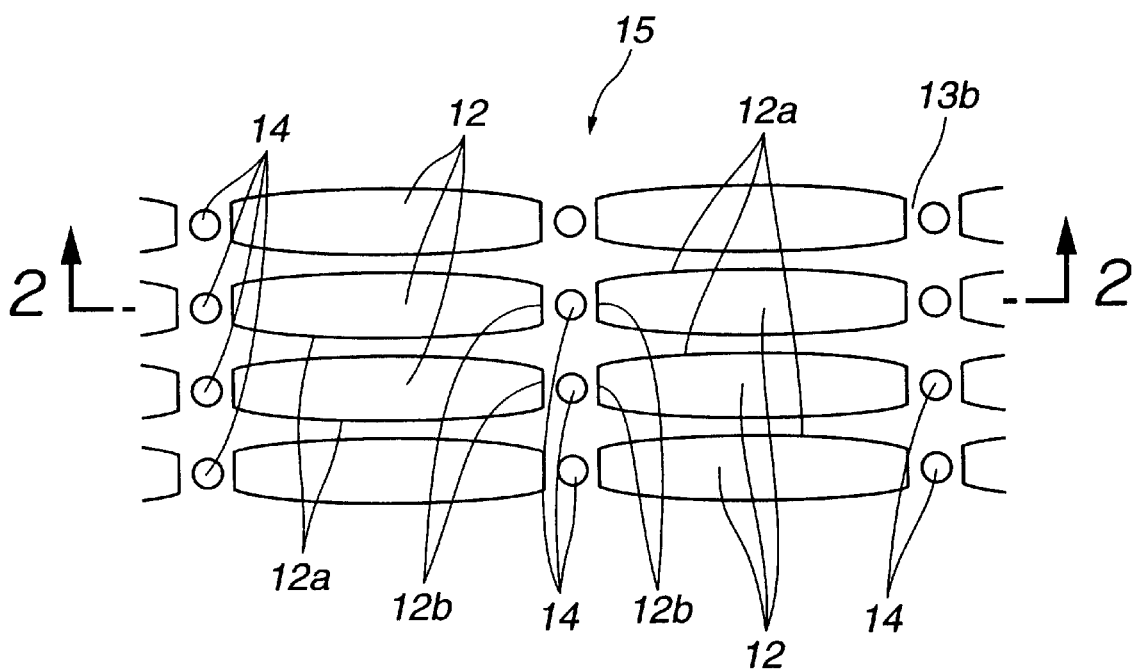
FIG. 8 is a plan view of the soil reinforcing resin net according to the third embodiment.
Figure 9:
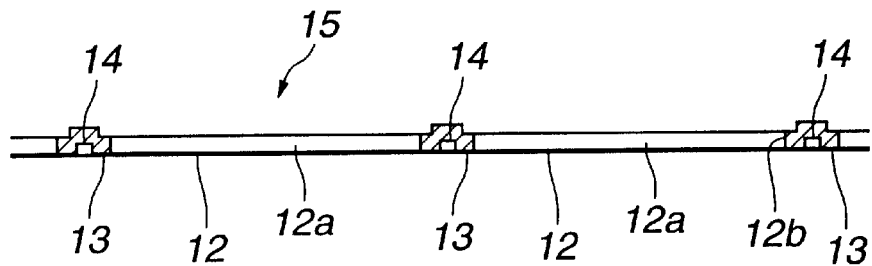
FIG. 9 is a sectional view taken on line 2—2 of the soil reinforcing resin net according to the third embodiment.

FIG. 8 is a plan view of the resin net thus obtained, and FIG. 9 is a sectional view taken on line 2—2 of FIG. 8. The hole 12 in the resin net 15 has opposed ribs 12a and opposed bars 12b. The length of the ribs 12a is 150 mm. The projections 14 are left on bar portions 13b.

According to the third embodiment of the present invention, the resin net has a structure in which the projections are arranged on the bar portions in the direction rectangular to the pull-out direction, whereby the pull-out resistance of the resin net becomes very large. Additionally, according to this embodiment, it is possible to effectively, integrally form the projections on the surface of the resin net having a difficulty in adhesive bonding with separate projections.

Figure 10A:
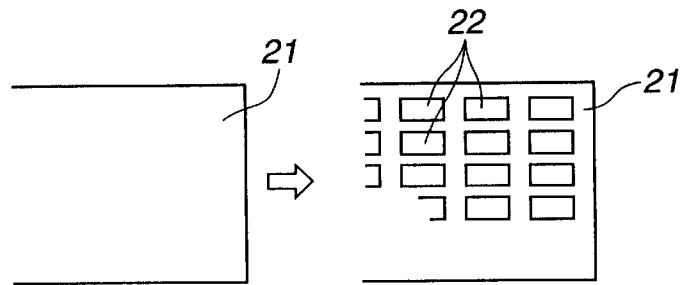
FIGS. 10A to 10D are views showing steps of producing a soil reinforcing resin net according to a fourth embodiment of the present invention.
Figure 10B:
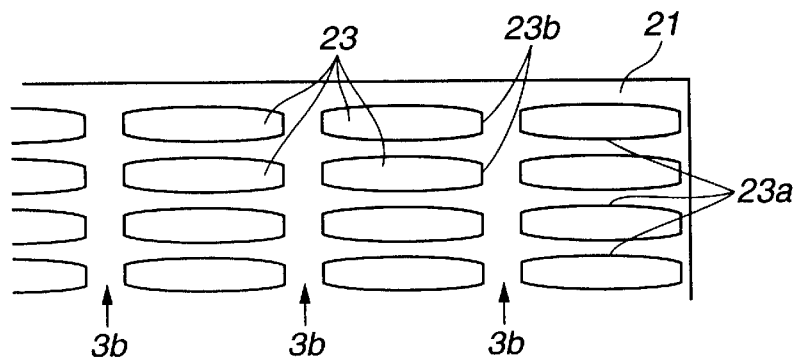
Figure 10C:
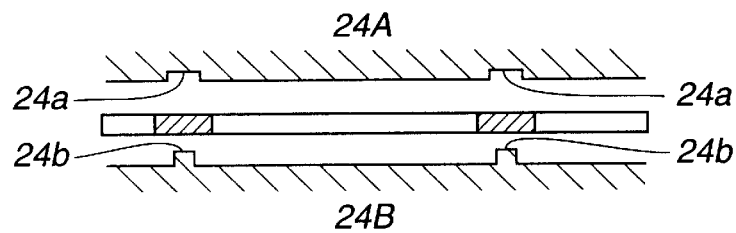
Figure 10D:
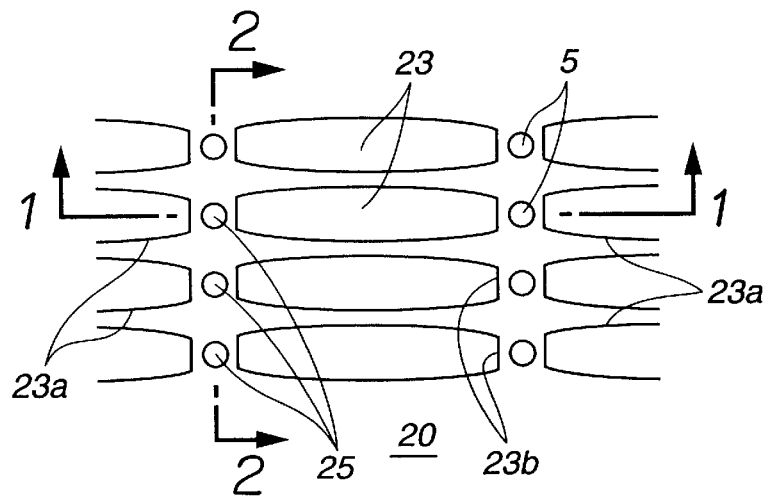

FIGS. 10A to 10D are views showing steps of producing a resin net 20 according to a fourth embodiment of the present invention. At first step shown in FIG. 10A, a polyethylene sheet 21 having a thickness of 2 mm is punched to form rectangular holes 12 each having a size of 10 mm×20 mm, which holes are spaced at intervals of 10 mm in the transverse direction and spaced at intervals of 15 mm in the longitudinal direction. At second step shown in FIG. 10B, the sheet 21 is drawn in the direction along the long sides of the rectangular holes 22. Each of holes 23 of the sheet 21 thus drawn has opposed ribs 23a and opposed bars 23b perpendicular to the ribs 23a. The length of the ribs 23a is 150 mm. At third step shown in FIG. 10C, bar portions or lands between the bars 23b of the sheet 21 are pressed by a pair of pressing members 24A and 24B. The pressing member 24A includes recessed cavities 24a each having a specific shape and the pressing member 24B includes projections 24b facing to the recessed cavities 24a. As shown in FIG. 10D, projections 25 defined by the cavities 24a and the projections 24b are formed on the bar portions between the bars 23b.

Figure 11:
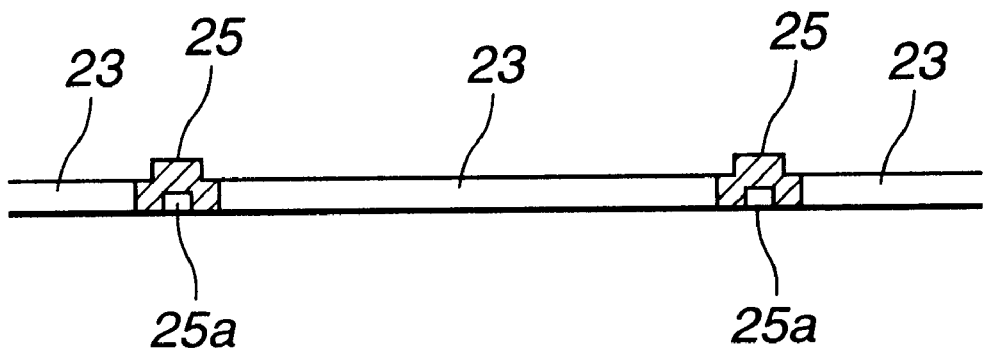
FIG. 11 is a sectional view taken on line 1—1 of FIG. 10D showing the soil reinforcing resin net according to the fourth embodiment of the present invention.
Figure 12:
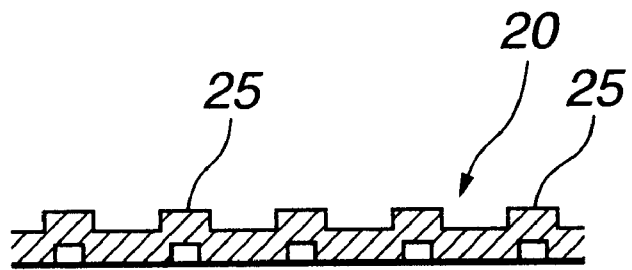
FIG. 12 is a sectional view taken on line 2—2 of FIG. 10D showing the soil reinforcing resin net according to the fourth embodiment of the present invention.
Figure 13:
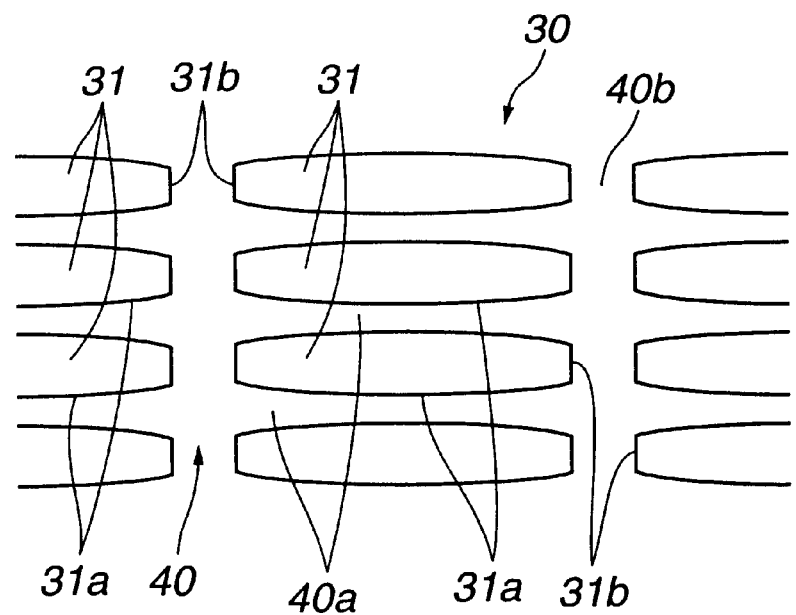
FIG. 13 is a plan view of a related art reinforcing resin net.
Figure 14:
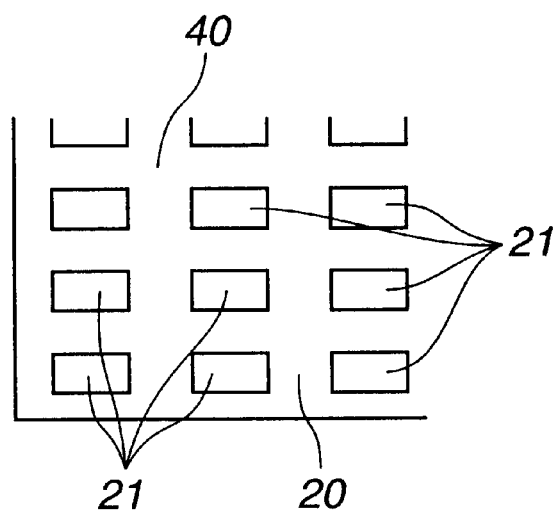
FIG. 14 is a plan view of a sheet taken as a base of the related art reinforcing resin net.

FIG. 11 is a sectional view taken on line 1—1 of FIG. 10D showing a resin net 20 thus obtained, and FIG. 12 is a sectional view taken on line 2—2 of FIG. 10D. The projections 25 are formed by the cavities 24a and the projections 24b as described above, and recesses 25a corresponding to the projections 24b are formed on the back side of the resin net 20. Since the projections 25 are formed after the drawing step, they keep original shapes. As a result, the projections 25 can certainly exhibit the pre-determined pull-out resistance in soil.

According to the fourth embodiment of the present invention, since the projections each having a specific shape are formed on the bar portions of the soil reinforcing resin net, the pull-out resistance of the resin net becomes very large.

Next, a drawn product of a polyethylene based resin of the present invention will be described.

The drawn product of a polyethylene based resin of the present invention is obtained by drawing a polyethylene based resin composed of a linear ethylene main chain having saturated hydrocarbon groups branched thereto. The number of the branched saturated hydrocarbon group chain is 0.3 or more in average in one molecule. In this case, the branched chain may be located at any position of the principal chain.

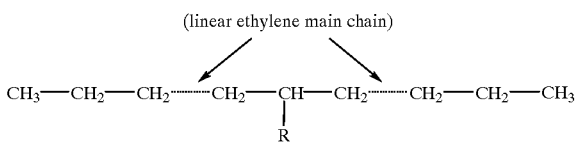

[in the chemical formula, R is a saturated monovalent hydrocarbon group]

As the saturated hydrocarbon group constituting the branched chain, there may be used a saturated hydrocarbon group having the carbon number of one or more, preferably, an ethyl group, or an alkyl group having the carbon number ranging from 3 to 10. In addition, a polyethylene based resin in which the carbon number of the branched chain is specified to be 10 or less is advantageous in that crystallization of the resin is made easy and the breaking strength thereof is enhanced.

In the case where the saturated hydrocarbon group R of the branched chain is the ethyl group, the average number of R in one molecule is preferably in a range of 0.7 or more, more preferably, 1.5 or more in terms of creep characteristic and strength.

On the other hand, in the case where the saturated hydrocarbon group R of the branched chain is the alkyl group in which the carbon number is in the range of 3 to 10, the alkyl group may be a straight chain type or may have a branched chain; however, it is preferably the straight chain type alkyl group. In this case, the number of R in one molecule is preferably in a range of 0.3 or more, more preferably, 0.5 or more in terms of creep characteristic and strength.

Even in the case where the saturated hydrocarbon group of the branched chain is a mixture of the ethyl group and the alkyl group in which the carbon number is in the range of 3 to 10, it is sufficient for the number of the alkyl groups in one molecule to be in a range of 0.3 or more.

Additionally, if the number of the branched chains becomes larger, the density of the polyethylene based resin becomes lower. Accordingly, the upper limit of the number of the branched chains may be set such that the density of the polyethylene based resin is in a range of 0.94 g/cm$^3$ or more, particularly, 0.95 g/cm$^3$ or more.

The branched chain composed of a saturated hydrocarbon group having the carbon number of 1 or more is obtained by copolymerization of ethylene and a slight amount of α-olefin, particularly, α-olefin having the carbon number of 3 to 12. As the above branched chain, there may be used a straight chain type such as 1-butene, 1-pentene, 1-hexene, 1-heptene, 1-nonene, 1-decene, 1-undecene or 1-dodecene; or a type with a branched chain such as 3-methyl- 1-butene, 3-methyl- 1-pentene, 4-methyl-1-pentene, 4-methyl-1-hexene, or 5-methyl- 1-hexene. However, as described above, the branched chain generated in the polyethylene molecules is preferably composed of the straight chain type saturated hydrocarbon group having the carbon number of 3 to 10.

Further, according to the present invention, the polyethylene based resin preferably contains carbon black in an amount of 0.1 to 10 parts by weight on the basis of 100 parts by weight of the polyethylene based resin.

As the polyethylene based resin used in the present invention, there may be used a high density polyethylene based resin having a density in a range of 0.94 g/cm$^3$ or more, preferably, 0.95 g/cm$^3$ or more. The high density polyethylene based resin is easy to be crystallized, and is increased in strength and elasticity. The weight average molecular weight of the high density polyethylene based resin is not particularly limited but is generally in a range of 100,000 to 400,000.

The drawn product of the present invention is obtained by drawing the above-described polyethylene based resin. In this case, the drawing ratio is not particularly limited but may be in a range of 3 to 20 times, particularly, 5 to 15 times. Additionally, drawing may be performed in accordance with a known drawing method.

The drawn product of the present invention is suitably used for formation of a soil reinforcing net for preventing slip of filling-up soil or reinforcing soft soil. In particular, the drawn product is preferably used as a material of a net finally drawn in the above-described in the embodiments 1 to 4.

EXAMPLE

The present invention will be more clearly understood by way of the following examples:

Inventive Example 1

A polyethylene based resin (density: 0.951 g/cm$^3$) composed of a linear ethylene main chain having n-butyl groups branched thereto was used. The number of the n-butyl branched chain (side chain) was 1.2 in average in one molecule, and the branched chains were present in the linear ethylene main chain.

Figure 15:
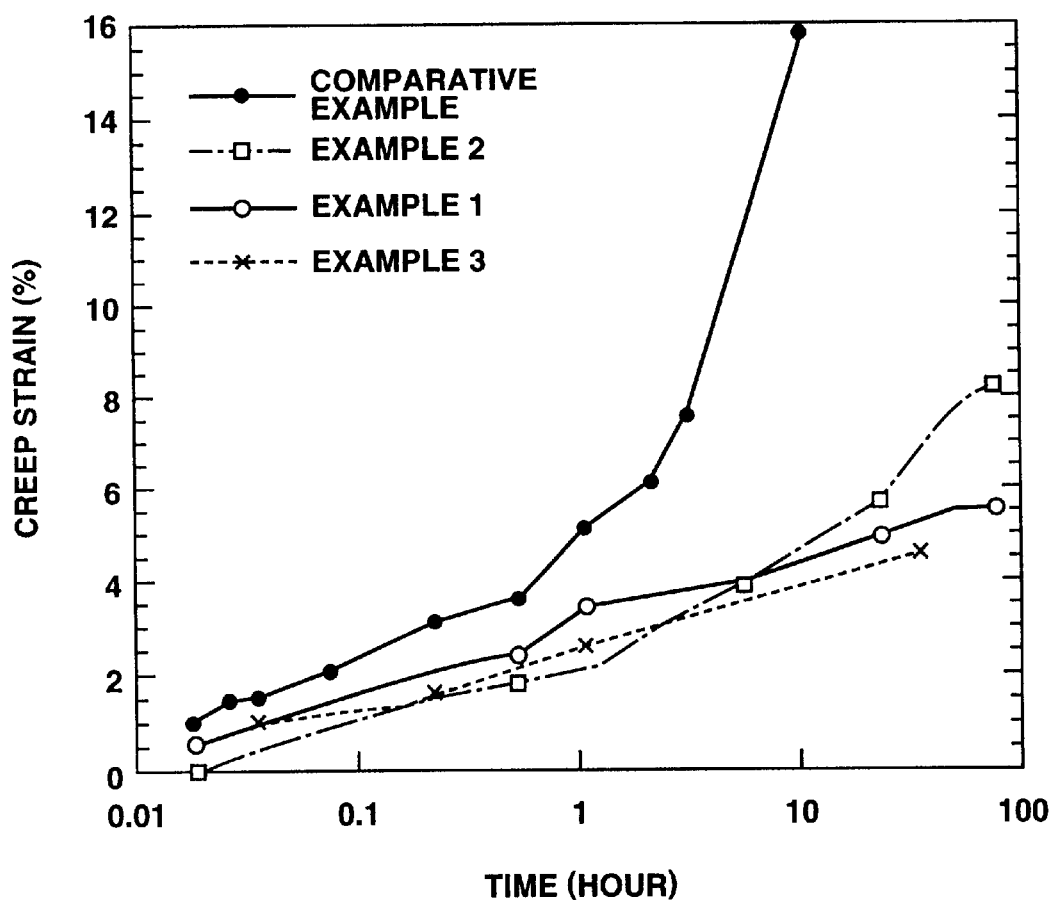
FIG. 15 is a graph showing the result of a creep test for various drawn products of polyethylene based resins.

The polyethylene based resin was extruded into a sheet shape by an extruder. The resultant sheet was drawn at a temperature of 100° C., 100 mm/min, and a drawing ratio of 7.5 times. The drawn product thus obtained was subjected to a creep test performed at a temperature of 23±2° C. and a humidity of 50±20% under a load of 67.2 kg. The result is shown in FIG. 15.

The branched chain was measured by a $^{13}$C-NMR apparatus sold by JEOL Ltd. (measurement temperature: 130° C.; solvent: ODCB (orthodichlorbenzene)).

Inventive Example 2

The procedure in Inventive Example 1 was repeated except that a polyethylene based resin (density: 0.950 g/cm$^3$) having, in the linear ethylene main chain, branched chains composed of the ethyl groups at the number of 2.0 in average in one molecule was used. The resultant drawn product was subjected to creep test in the same manner as that in Inventive Example 1. The result is shown in FIG. 15.

Inventive Example 3

The procedure in Inventive Example 1 was repeated except that a polyethylene based resin (density: 0.957 g/cm$^3$) having, in the linear ethylene main chain, branched chains composed of the ethyl groups at the number of 1.0 in average in one molecule was used. The resultant drawn product was subjected to creep test in the same manner as that in Inventive Example 1. The result is shown in FIG. 15.

Comparative Example

The procedure in Inventive Example 1 was repeated except that a polyethylene based resin (density: 0.958 g/cm$^3$) having branched chains composed of the ethyl groups at the number of 0.2 in average in one molecule was used. The resultant drawn product was subjected to creep test in the same manner as that in Inventive Example 1. The result is shown in FIG. 15.

As shown in FIG. 15, the creep strain of each of the drawn products in Inventive Examples 1 to 3 is 10% or less even after an elapse of 100 hr, while the creep strain of the drawn product in Comparative Example is more than 15% only after an elapse of 10 hr.

As described above, the drawn product of the polyethylene based resin of the present invention is excellent in creep characteristic and high in strength, and therefore, it is suitable used for a soil reinforcing net.

While the embodiments of the present invention have been described using specific terms, such description is for illustrative purposes only, and it is to be understood that changes and variations may be made without departing from the spirit or scope of the following claims.

What is claimed is:

1. A soil reinforcing resin net comprising:
    hole portions arranged in the longitudinal and transverse directions of said resin net, each of which is formed by a pair of opposed ribs and a pair of opposed bars;
    bar portions located between the hole portions in the longitudinal direction; and
    projecting portions located on said bar portions, wherein said projecting portions comprise a plurality of projections on said bar portions at specific intervals in the transverse direction.

2. A resin net according to claim 1, wherein said projecting portions are arranged in the direction perpendicular to the drawing plane of said hole portions.

3. A resin net according to claim 1, wherein said projecting portions are fixed on said bar portions by vibrational fusion, ultrasonic fusion or hot plate fusion.

4. A method of producing the soil reinforcing resin net of claim 1, comprising the steps of:
    punching a resin sheet to form hole portions arranged in the longitudinal and transverse directions of the resin sheet;
    drawing the resin sheet having the hole portions in the uniaxial direction, to form elongated hole portions each having a pair of opposed ribs and a pair of opposed bars; and
    fixing projecting portions on bar portions located between the hole portions in the longitudinal direction by vibrational fusion, ultrasonic fusion or hot plate fusion.

5. A method of producing a soil reinforcing resin net according to claim 4, wherein the projecting portions are fixed on the bar portions in the direction perpendicular to the drawing plane of the hole portions.

6. A method of producing the soil reinforcing resin net of claim 1, comprising the steps of:
    punching a resin sheet to form hole portions arranged in the longitudinal and transverse directions of the resin sheet and simultaneously forming, by pressing, a plurality of projections on bar portions located between the hole portions in the longitudinal direction and between the hole portions at specific intervals in the transverse direction; and
    drawing the resin sheet having the hole portions in the longitudinal direction to form elongated hole portions each having a pair of opposed ribs and a pair of opposed bars, thereby forming the projections on the bar portions of the drawn sheet.

7. A method of producing a soil reinforcing resin net according to claim 6, wherein the projections are formed between the elongated hole portions in the longitudinal direction.

8. A method of producing the soil reinforcing resin net of claim 1, comprising the steps of:
    punching a corrosion resisting resin sheet to form hole portions regularly arranged in the longitudinal and transverse directions;
    drawing the resin sheet having the hole portions in the uniaxial direction to form elongated hole portions each having a pair of opposed ribs and a pair of opposed bars; and forming projections on bar portions located between the hole portions in the longitudinal direction of the drawn sheet by pressing.

9. A method of producing a soil reinforcing resin net according to claim 8, wherein the projections are formed on the bar portions between the elongated hole portions.

10. A method of producing a soil reinforcing resin net according to claim 8, wherein the resin sheet is a polyethylene sheet or a polypropylene sheet.

11. A resin net according to claim 1, wherein said projecting portions are located between the bars of adjacent hole portions in the longitudinal direction.

12. A resin net according to claim 1, wherein said projecting portions are located on crossing portions which are surrounded by four of said hole portions.

13. A resin net according to claim 1, wherein said projecting portions traverse both the bar portions and crossing portions which are surrounded by four of said hole portions.

14. A resin net according to claim 1, wherein said net comprises polypropylene or polyethylene.

15. A resin net according to claim 1, wherein the projections are formed on one side of the net, with a corresponding recess on the other side of the net.

16. A resin net according to claim 1, wherein said net is formed of a polyethylene based resin composed of a linear ethylene main chain having 0.3 or more in average of saturated hydrocarbon groups branched thereto in one molecule.

17. A resin net according to claim 1, wherein said net is formed of a polyethylene based resin in which the carbon number of the branched chain is 10 or less.

18. A resin net according to claim 1, wherein said net is formed of a polyethylene based resin containing carbon black.

19. A resin net according to claim 1, wherein said net is formed of a high density polyethylene based resin having a density of 0.94 $g/cm^3$ or larger.

20. A resin net according to claim 1, wherein said projecting portions are mainly made from the same material as the resin net material.

21. A resin net according to claim 1, wherein said projecting portions are made from a material comprising polypropylene, polyethylene or nylon.

* * * * *